United States Patent
Lee et al.

(10) Patent No.: US 10,791,830 B2
(45) Date of Patent: Oct. 6, 2020

(54) GUN HOLDER

(71) Applicant: Koduct Co., LTD, Gangseo-gu (KR)

(72) Inventors: Woo Jun Lee, Geumjeong-gu (KR); Sung Soo Sim, Haeundae-gu (KR)

(73) Assignee: Koduct Co., LTD (KR)

( * ) Notice: Subject to any disclaimer, the term of this patent is extended or adjusted under 35 U.S.C. 154(b) by 0 days.

(21) Appl. No.: 16/308,513

(22) PCT Filed: Jun. 8, 2017

(86) PCT No.: PCT/KR2017/005929
§ 371 (c)(1),
(2) Date: Dec. 10, 2018

(87) PCT Pub. No.: WO2017/217689
PCT Pub. Date: Dec. 21, 2017

(65) Prior Publication Data
US 2019/0159592 A1    May 30, 2019

(30) Foreign Application Priority Data

Jun. 13, 2016 (KR) .......................... 10-2016-0073198

(51) Int. Cl.
*A47B 81/00* (2006.01)
*F41C 33/06* (2006.01)
(Continued)

(52) U.S. Cl.
CPC ............ *A47B 81/005* (2013.01); *A47B 81/00* (2013.01); *F41A 23/18* (2013.01); *F41C 33/06* (2013.01);
(Continued)

(58) Field of Classification Search
CPC ....... A47B 81/005; A47B 81/00; F41C 33/06; F41A 23/18
See application file for complete search history.

(56) References Cited

U.S. PATENT DOCUMENTS 492,304 A * 2/1893 Markle ..................... A47F 3/10
312/135
505,320 A * 9/1893 Meadows ............ A47B 81/005
211/64
(Continued)

FOREIGN PATENT DOCUMENTS

CN        201043405        4/2008
KR      20100111871       10/2010
(Continued)

OTHER PUBLICATIONS

Office Action for counterpart Korean Patent Application 10-2016-0073198 dated Aug. 23, 2017.
(Continued)

*Primary Examiner* — Kimberley S Wright

(57) ABSTRACT

A gun holder includes a central shaft; and a holder part, which has slots formed such that a plurality of guns is respectively and radially held around the central shaft, and is rotatable around the central shaft. The gun holder enables a user to take out a gun assigned only to the user and simply prevents other guns from being withdrawn, and has a locking means corresponding to respective guns when the guns are stored, wherein the locking means is operated by one actuator, thereby enabling power consumption and manufacturing costs to be reduced.

16 Claims, 6 Drawing Sheets

(51) Int. Cl.
*F41A 23/18* (2006.01)
*G06K 9/00* (2006.01)
*G01L 5/00* (2006.01)
*G06F 3/0488* (2013.01)
*G07C 9/00* (2020.01)

(52) U.S. Cl.
CPC .............. *G01L 5/00* (2013.01); *G06F 3/0488* (2013.01); *G06K 9/00* (2013.01); *G06K 9/00006* (2013.01); *G07C 9/00182* (2013.01); *G07C 2009/00277* (2013.01)

(56) References Cited

U.S. PATENT DOCUMENTS

| | | | | | |
|---|---|---|---|---|---|
| 1,478,043 | A | * | 12/1923 | Matteson | A63D 15/10 211/68 |
| 2,158,623 | A | * | 5/1939 | Fischbacher | A47B 81/005 312/6 |
| 2,512,622 | A | * | 6/1950 | Fish | F41C 33/06 206/317 |
| 2,869,729 | A | * | 1/1959 | Hayden | A47B 81/005 211/64 |
| 3,685,661 | A | * | 8/1972 | Kimmel | A47B 81/005 211/64 |
| 3,762,789 | A | * | 10/1973 | Robertson | A47B 81/005 312/305 |
| 3,848,940 | A | * | 11/1974 | Berens | A47B 81/005 312/135 |
| 3,927,923 | A | * | 12/1975 | Kimmel | A47B 81/005 312/125 |
| 4,099,808 | A | * | 7/1978 | Oakley | A47B 81/005 109/50 |
| 4,688,685 | A | * | 8/1987 | Brace | A63C 11/028 211/60.1 |
| 5,366,075 | A | * | 11/1994 | Mills | A63B 55/00 206/315.6 |
| 6,865,993 | B2 | * | 3/2005 | Bartel | E05D 15/56 109/48 |
| 6,868,975 | B2 | * | 3/2005 | Sells | A47B 49/00 211/163 |
| 7,043,946 | B2 | * | 5/2006 | Cline | E05B 63/0043 109/45 |
| 7,137,511 | B1 | * | 11/2006 | Crowell | F41A 23/18 211/4 |
| 7,559,428 | B2 | * | 7/2009 | Matzick | A47B 81/005 211/64 |
| 7,748,545 | B2 | * | 7/2010 | Johnson | F17C 13/084 211/163 |
| 8,393,280 | B2 | * | 3/2013 | Bartel | E05G 1/00 109/45 |
| 8,474,923 | B2 | * | 7/2013 | Pendleton | A47B 81/005 109/48 |
| 8,950,596 | B2 | * | 2/2015 | Arabian | E05B 1/00 211/64 |
| 9,097,057 | B2 | * | 8/2015 | Pendleton | E05B 17/2038 |
| 9,198,512 | B1 | * | 12/2015 | Moayeri | A47B 81/005 |
| 10,004,961 | B2 | * | 6/2018 | Pittman | A63B 55/00 |
| 10,094,161 | B2 | * | 10/2018 | Meier, Jr. | E05B 65/0075 |
| 2003/0015486 | A1 | * | 1/2003 | Chen | A47F 5/02 211/70 |
| 2004/0140235 | A1 | * | 7/2004 | Cleveland | A47B 81/005 206/315.11 |
| 2007/0000851 | A1 | * | 1/2007 | Matzick | A47B 81/005 211/64 |
| 2008/0229983 | A1 | * | 9/2008 | Pendleton | E05G 1/02 109/45 |
| 2011/0174199 | A1 | * | 7/2011 | Pendleton | E05B 17/2038 109/59 R |
| 2016/0199708 | A1 | * | 7/2016 | Pittman | A63B 55/40 414/811 |

FOREIGN PATENT DOCUMENTS

| | | |
|---|---|---|
| KR | 101289463 | 7/2013 |
| WO | WO2005013031 | 2/2005 |

OTHER PUBLICATIONS

English Abstract of Published Chinese Patent Application No. CN201043405 Apr. 2, 2008.
English Abstract of Published Korean Patent Application No. KR101289463 Jul. 24, 2013.
English Abstract of Published Korean Patent Application No. KR20100111871 Oct. 18, 2010.
Written Opinion for PCT/KR2017/005929 dated Sep. 6, 2017.
International Search Report for PCT/KR2017/005929 dated Aug. 6, 2017.

\* cited by examiner

GUN HOLDER

PRIORITY

This application is a National Stage filing under 35 U.S.C. § 371 of, and claims priority via, International Application No. PCT/KR2017/005929 for GUN HOLDER, filed Jun. 8, 2017, and pursuant to 35 U.S.C. § 119, this application also claims the benefit of earlier filing date and right of priority to Korean Patent Application Number 10-2016-0073198, filed on Jun. 13, 2016. The entire content of PCT/KR2017/005929 is hereby incorporated by reference. The entire content of Korean Patent Application Number 10-2016-0073198 is hereby incorporated by reference.

BACKGROUND

It is important to allow safely storing and quickly using guns when the guns are handled. Thus, guns were conventionally arranged and stored in a row on a strong storage bin or storage stand made of metal material, and were taken out for use or taken in by opening or closing a door. Furthermore, the conventional gun holder was made in a cabinet-shaped storage bin, and when an emergency occurs, a gun was quickly and accurately taken out one by one for use from a gun holder by opening a door.

Furthermore, an alignment structure of the gun storage bin thus described was to align the guns by arranging the guns in a row through insertion of a gun barrel into a through hole or a groove installed inside the storage bin. Moreover, when the alignment of the guns into an alignment panel is finished, the door of the gun storage bin is closed to prevent an access from outside by protecting the guns at an inside of the storage bin.

However, the abovementioned gun storage bin has suffered from risks of unlawful gun withdrawal where the storage bin was exposed to a constant danger of allowing other guns to be unlawfully taken out, in addition to individually-assigned guns while the door was opened.

As a result, a gun storage bin provided with an individual locking device was disclosed in which guns are individually stored and/or taken out from gun storage bin.

However, even if the individual locking device is provided, an actuator for driving the individual locking device must be provided to comport with the number of individual locking devices, to disadvantageously increase the manufacturing cost.

In addition, there still remained the hitherto problems of difficulty in utilizing a space and in moving the gun storage bin around because the conventional method of aligning the guns in a row remained unchanged and the storage bin was voluminously used without any big changes.

The present invention is provided to solve the aforementioned problems, and it is an object of the present invention to provide a gun holder configured to allow a user to withdraw his or her own allocated guns only while preventing other user from withdrawing the said his or her allocated guns.

It is another object of the present invention to provide a gun holder configured to arrange a locking means corresponding to each gun during storage of guns, while the locking means is activated by one actuator.

It is still another object of the present invention to provide a less-voluminous gun holder configured to increase a spatial utilization and to be movable during military trainings or during combats.

In one general aspect of the present invention, there is provided a gun holder, the gun holder comprising:
a central shaft; and
a rotatable holder part formed with a plurality of slots about the central shaft to allow guns to be radially stood, and rotatable about the central shaft.

Preferably, but not necessarily, the holder part may be so arranged with guns as to allow an imaginary extension line of gun barrel to be converged toward the central shaft or an imaginary extension line of the central shaft.

Preferably, but not necessarily, the holder part may include a first holder part arranged with a buttstock of a stood gun, and a second holder part arranged with a gun barrel of stood gun.

Preferably, but not necessarily, the first holder part may include a stand groove arranged with the buttstock of stood gun, and a stand protrusion preventing the buttstock from being disengaged by encompassing the stand groove.

Preferably, but not necessarily, the first holder part may further include a first electronic tag recognition part recognizable of an electronic tag installed on the buttstock of the stood gun.

Preferably, but not necessarily, the second holder part may further include a first locking means preventing the stood guns from being withdrawn.

Preferably, but not necessarily, the second holder part may include a stand sensor recognizing the standing of guns.

Preferably, but not necessarily, the gun holder may further include a driving part to allow the holder part to rotate.

Preferably, but not necessarily, the driving part may further include a motor rotating the holder part about the central shaft, a decelerator adjusting the rotation of motor, and a battery providing an electric power to the motor or to the decelerator, wherein the holder part may be rotated as much as a predetermined angle by the motor and the decelerator.

Preferably, but not necessarily, the gun holder may further comprise:
an interface part recognizable of a user and selectable of gun allocated to the user in response to the user's intention;
a display part displaying accommodation and withdrawal state of the gun on a screen; and
a controller sending an electric signal to each element to allow guns to be stood or withdrawn by a user's manipulation through the interface part.

Preferably, but not necessarily, the display part may be formed with a touch screen manipulatable through a user's touch by allowing the interface part to be embedded in the screen.

Preferably, but not necessarily, the interface part may be embedded with a recognizable means recognizable of a user.

Preferably, but not necessarily, the recognizable means may further include a second electronic tag recognition part recognizable of an electronic tag possessed by a user, whereby the first locking means can be unlocked by recognizing an electronic tag of relevant gun when the second electronic tag recognition part recognizes a user's electronic tag.

Preferably, but not necessarily, the recognizable means may recognize a user's fingerprint.

Preferably, but not necessarily, the gun holder may further comprise:
a shock sensor detecting an outside shock; and
a warning means notifying the outside shock detected by the shock sensor to a user using the controller.

Preferably, but not necessarily, the gun holder may further comprise:

a support part supporting the central shaft and the holder part;

a case disposed at the support part with a pillar or conical shape to cover the central shaft and the holder part and formed with an opening at a lateral surface or at an upper surface to allow a user to withdraw or accommodate the gun; and a second locking means disposed at the support part to prevent the case from being disengaged.

Preferably, but not necessarily, when the second locking means is unlocked by a user, the case may be removed by the user, and the controller can send a signal to the first locking means to unlock the locking of the first locking means.

Preferably, but not necessarily, when there is no manipulation of interface part by the user, the slot not stood with the gun may be exposed to an outside by the opening.

The present invention can make it easy for a user to withdraw only his or her allocated gun and to prevent other guns from being withdrawn.

Furthermore, a locking means is provided to correspond to each gun when the gun is stored, while the locking means can be activated by one single activator to thereby save an electric power consumption and a manufacturing cost.

Still furthermore, the present invention is easy in storage of guns and in maintenance and repair by reducing volume of occupied space over the conventional cross-sectional gun holder whereby a spatial utilization can be increased and mobility can be guaranteed even during military trainings or combat missions.

DETAILED DESCRIPTION OF THE DRAWINGS

Figure 1:
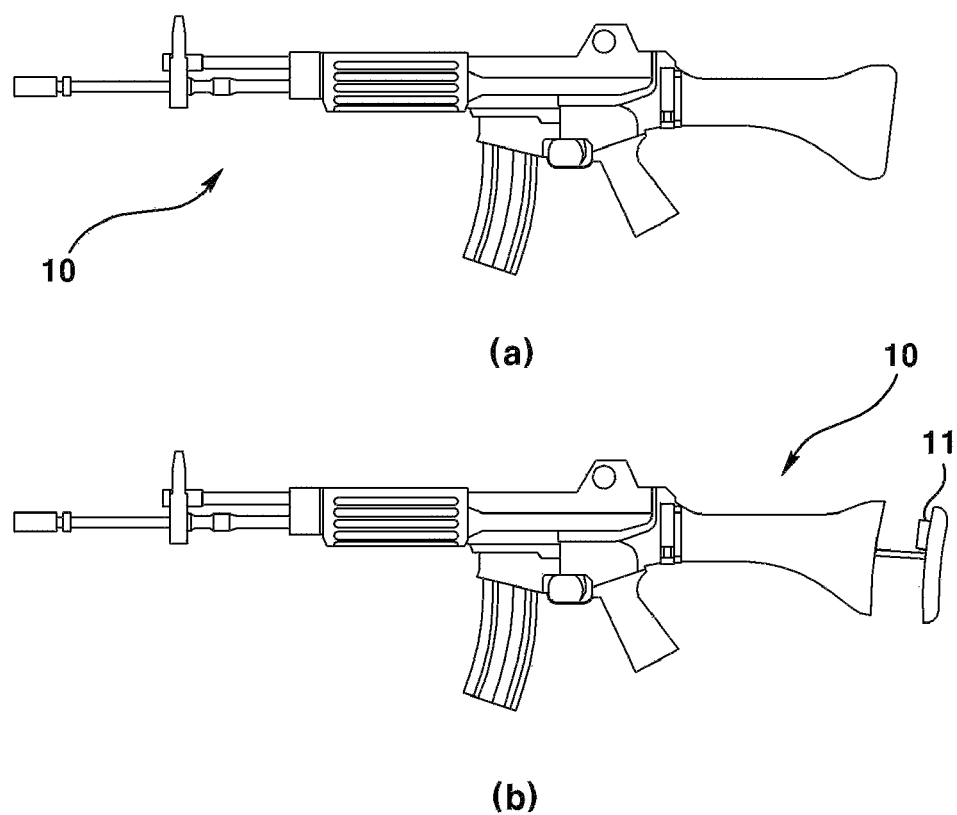
FIG. 1(a) is a schematic view illustrating a shape of a gun stood on a gun holder according to an exemplary embodiment of present invention.
FIG. 1(b) is a schematic view illustrating an electronic tag where a shape of a gun stood on a gun holder according to an exemplary embodiment of present invention.

Hereinafter, exemplary embodiments of the present invention will be described in detail with reference to the accompanying drawings. It will be understood that like reference numerals refer to like elements throughout, albeit being shown on different drawings. In the following description, well-known functions or constructions are not described in detail to avoid obscuring the present invention in unnecessary detail.

It will be understood that, although the terms first, second, A, B, (a), (b), etc. may be used herein to describe various elements, these elements should not be limited by these terms. These terms are only used to distinguish one element from another.

It will be understood that when an element is referred to as being "connected", "attached", or "coupled" to another element, it can be directly connected, attached, or coupled to the other element, or intervening elements may be present. In contrast, when an element is referred to as being "directly connected", "directly attached", or "directly coupled" to another element, no intervening elements are present.

Now, exemplary embodiments of the present invention will be described in detail with reference to the accompanying drawings. Although the accompanying drawings illustrate the gun holder according to the exemplary embodiment focused on rifles, the exemplary embodiments of present invention are not limited thereto, and the present invention may be applicable to other guns including pistols, machine guns and taser guns.

Figure 2:
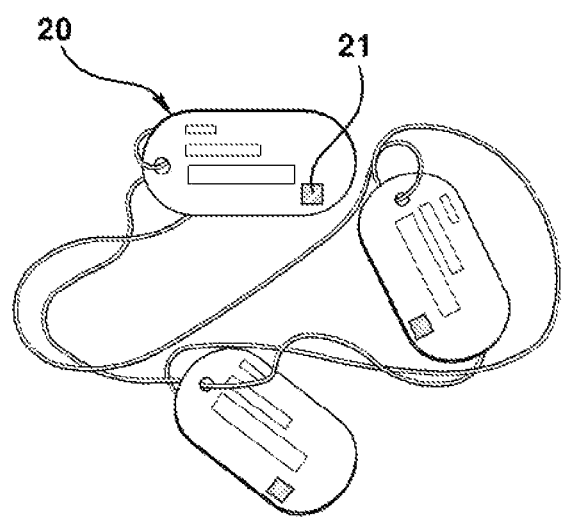
FIG. 2 is a schematic view illustrating an identification tag of a user used for a gun holder according to an exemplary embodiment of present invention.

FIG. 1(a) is a schematic view illustrating a shape of a gun stood on a gun holder according to an exemplary embodiment of present invention, FIG. 1(b) is a schematic view illustrating an electronic tag where a shape of a gun stood on a gun holder according to an exemplary embodiment of present invention, and FIG. 2 is a schematic view illustrating an identification tag of a user used for a gun holder according to an exemplary embodiment of present invention.

Referring to FIGS. 1(a) and 1(b), FIG. 2, an electronic tag (11,21) may be respectively installed on a gun (10) and an identification tag (20) of a user in order to stand a total of ten (10) guns (10) on a gun holder according to an exemplary embodiment of present invention.

Figure 3:
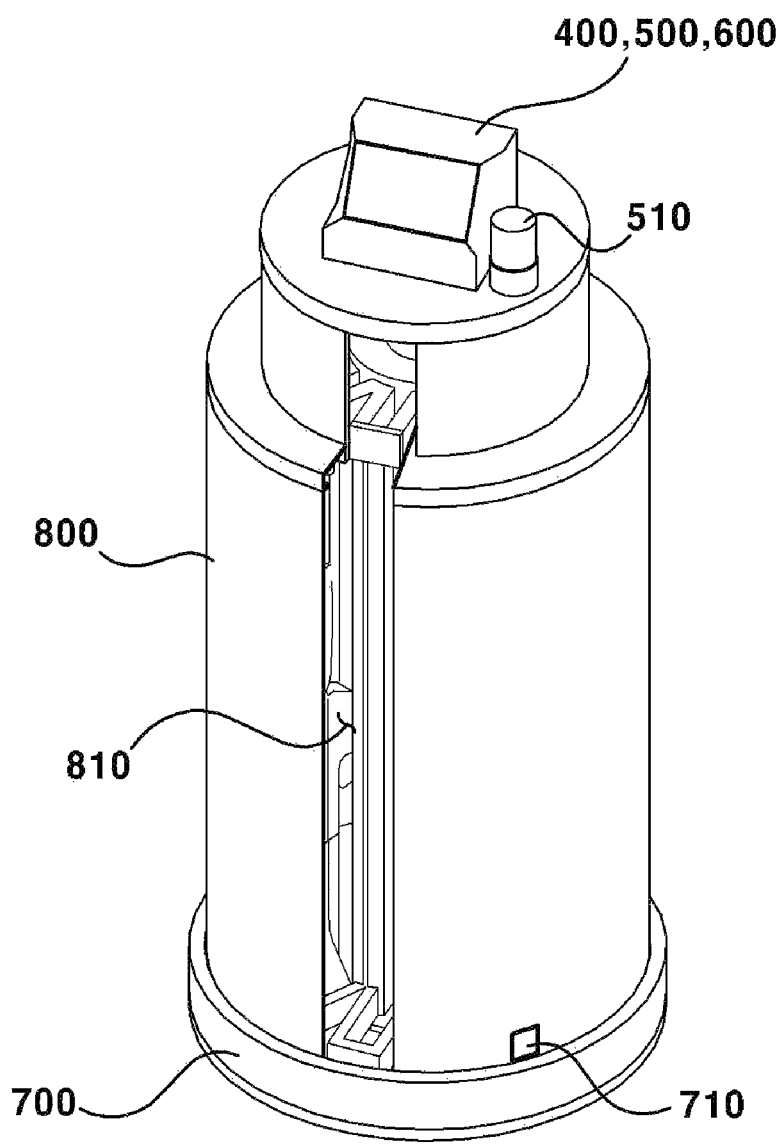
FIG. 3 is a perspective view illustrating a gun holder according to an exemplary embodiment of present invention.
Figure 4:
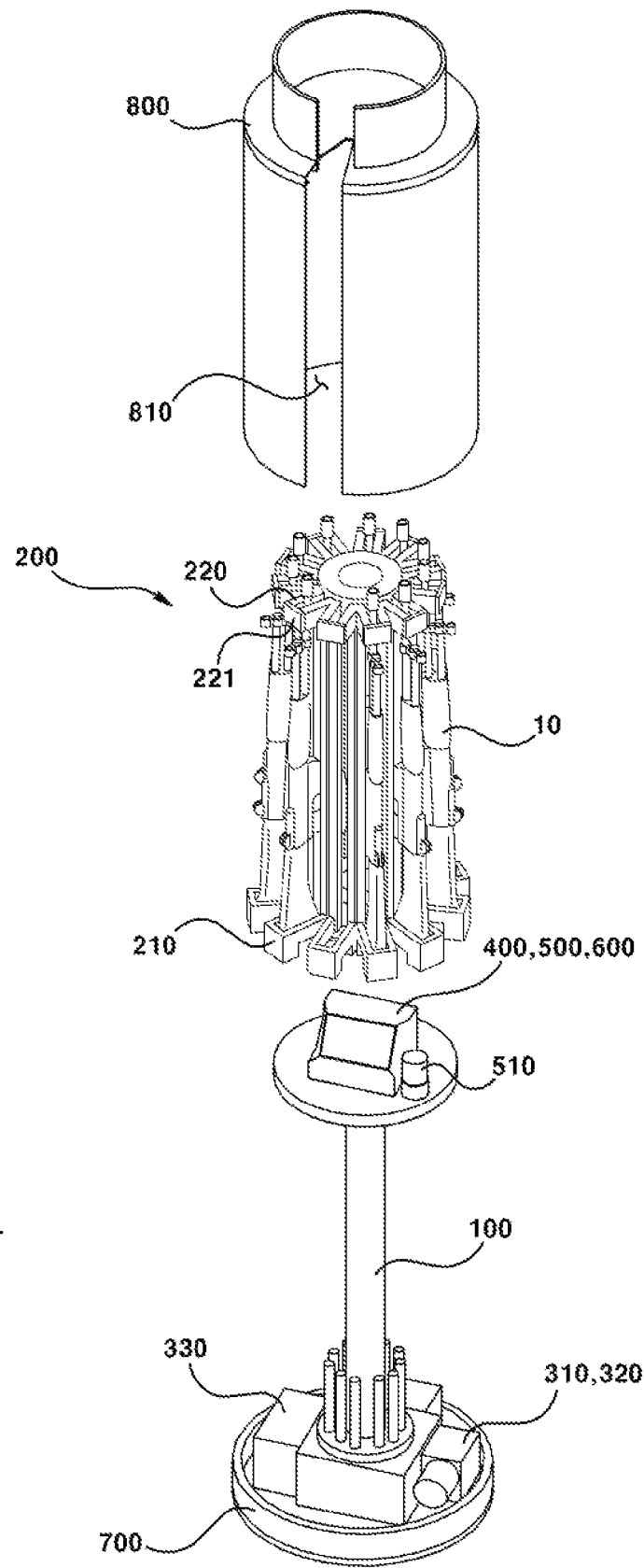
FIG. 4 is an exploded perspective view of FIG. 3.
Figure 5:
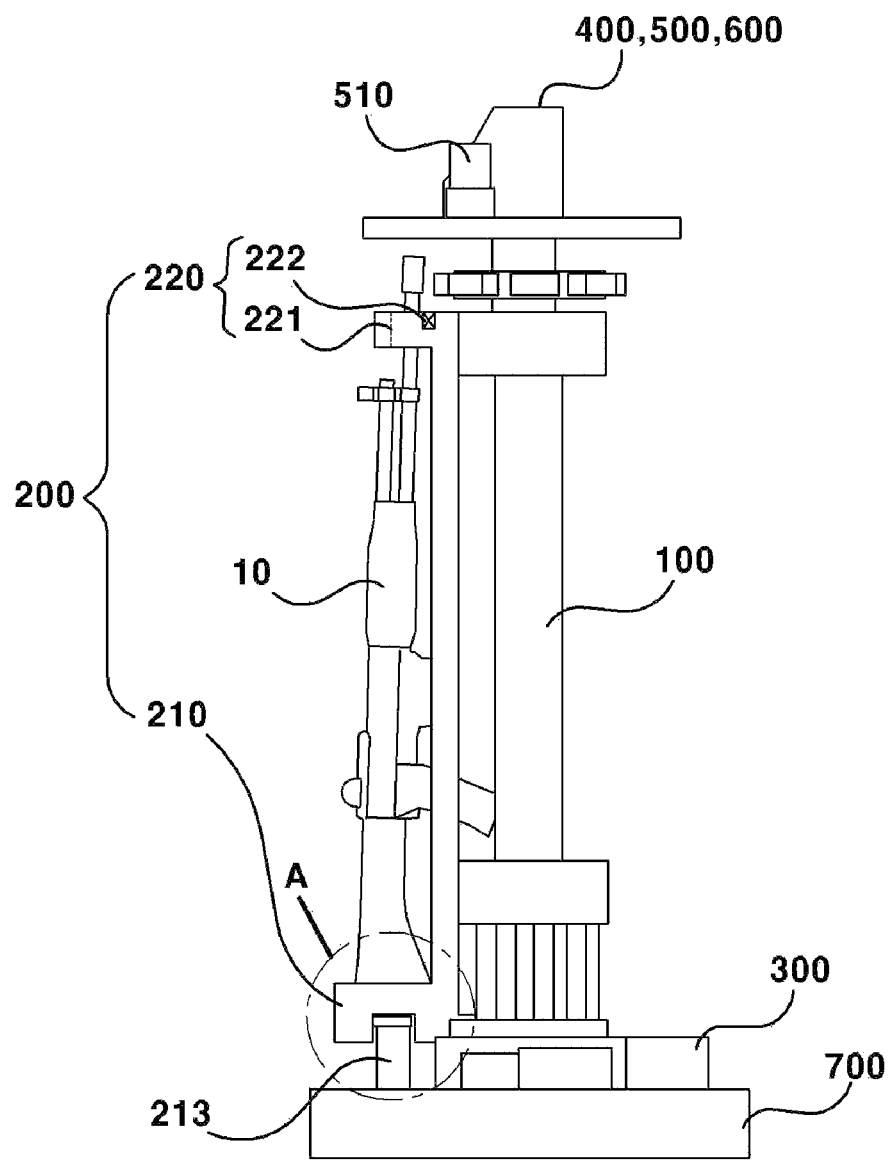
FIG. 5 is a conceptual view illustrating an interior of FIG. 3.
Figure 6:
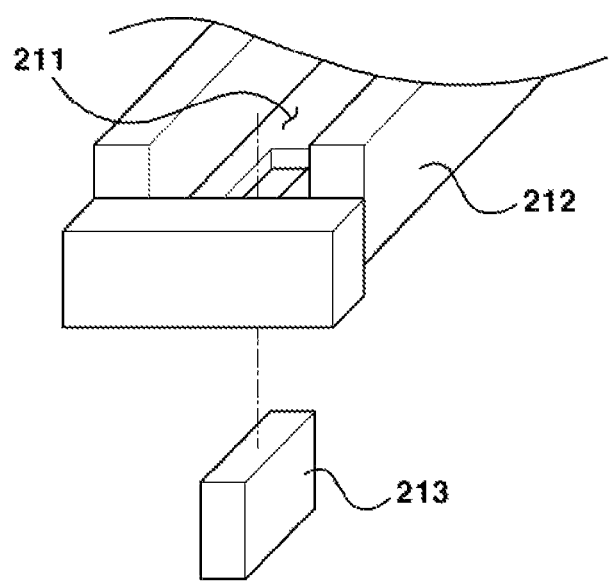
FIG. 6 is a conceptual perspective view illustrating 'A' portion of FIG. 5.

FIG. 3 is a perspective view illustrating a gun holder according to an exemplary embodiment of present invention, FIG. 4 is an exploded perspective view of FIG. 3, and FIG. 5 is a conceptual view illustrating an interior of FIG. 3.

Referring to FIGS. 3, 4 and 5, the gun holder according to an exemplary embodiment of present invention may include a central shaft (100) and a holder part (200).

The central shaft (100) may have a predetermined length from a floor to an upward direction. A surrounding of the central shaft (100) may be provided with a holder part (200) mounted with the guns (10). The holder part (200) may be radially mounted with guns (10), and the holder part (200) may rotate about the central shaft (100). The holder part (200) may be formed with slots (not shown) corresponding to each gun (10) to allow mounting a plurality of guns (10). Furthermore, the holder part (200) may be formed with partitions (not shown) between each slot, i.e., between guns (10) in order to prevent the plurality of guns (10) from being mutually interfered.

The guns (10) mounted on the holder part (200) may be stood to allow an imaginary extension line of gun barrel (no reference numeral) to meet an imaginary extension line of central shaft (100). That is, a muzzle (no reference numeral) of gun (10) may be so arranged as to face the imaginary extension line of central shaft (100). If the plurality of guns (10) is mounted on the holder part (200), the plurality of guns (10) may be so arranged as to converge toward the imaginary extension line of central shaft (100).

The holder part (200) may include a first holder part (210) and a second holder part (220). The first holder part (210) may be arranged at a position relatively lower than the second holder part (220) to a lengthwise direction of central shaft (100). Furthermore, the second holder part (220) may be so arranged as to be disposed at a relatively higher position at an outside of the central shaft (100) than the first holder part (210) to a lengthwise direction of central shaft (100). The first holder part (210) and the second holder part (220) may be mutually connected by a separate connection part (no reference numeral), and may have a mutually same rotation rate about the central shaft. That is, it is preferable that the first holder part (210) and the second holder part (220) be rotated at a mutually same predetermined angle by a driving part (300, described later).

The first holder part (210) may be arranged with a buttstock of the gun (10). The first holder part (210) may include a stand groove (211) and a stand protrusion (212), where the stand groove (211) may be arranged with the buttstock of gun (10) and a surrounding of stand groove (211) may be protrusively formed with the stand protrusion toward the second holder part (220), whereby the gun (10) mounted on the first holder part (210) may be prevented from being disengaged therefrom. The first holder part (210) may be formed with a through hole (no reference numeral), and the through hole may be inserted by a first electronic tag recognition part (213). The first electronic tag recognition part (213) can recognize a first electronic tag (11) mounted on the buttstock of the gun (10). The first electronic tag (11) may be a microchip, and may not be limited in shape and type as long as the first electronic tag (11) can recognize the gun of a user through the first electronic tag recognition part (213).

The second holder part (220) may be arranged with gun barrels of guns (10). The second holder part (220) may be formed to encompass a part of gun barrel. The second holder part (220) may include a first locking means (221). The second locking means (221) may prevent the guns from being withdrawn. Although the first locking means (221) is preferred to be formed at a part of the second holder part (220) most distantly disposed from the central shaft (100), the first locking means (221) may be variably disposed depending on a manufacturer's intention, and the shape and operational principle thereof are not particularly limited. The first locking means (221) in the exemplary embodiment of present invention may be formed to correspond to the number of slots at the stand grooves (211) mountable by the guns (10), and the actuator (not shown) may be also provided in correspondence to the number of first locking means (221). Furthermore, albeit not being illustrated in the drawings, a plurality of first locking means (221) may be provided and one single actuator (not shown) may be formed in order to open and close the plurality of first locking means (221) at one time. In addition, one single actuator (not shown) may be available and the first locking means (221) may be provided in a plural number to allow the second holder part (220) to rotate, and the first locking means (221) may be disposed to correspond to the position of actuator, whereby the first locking means (221) most proximate to the actuator can be opened and closed.

The second holder part (220) may further include a stand sensor (222). The stand sensor (222) may be variably manufactured according to a manufacturers' intention. For example, the stand sensor (222) may be a pressure sensor disposed at a part of the second holder part (220) contacting a gun barrel of gun (10), or may be a sensor detectable of infrared rays. Thus, the stand sensor (222) can recognize the gun (10) as long as the gun (10) is mounted on the second holder part (220).

The holder part (200) may be rotated about the central shaft (100). That is, a driving part (300) may be provided at a lower side of central shaft (100) and the holder part (200) to thereby enable rotation of holder part (200). The driving part (300) may include a motor (310), a decelerator (320) and a battery (330).

The motor (310) may generate a rotational force and transmit the rotational force to the driving part (300). At this time, the decelerator (320) may transmit the rotational force to the driving part (300) by adjusting the rotational force of motor (310). That is, the decelerator (320) may transmit the rotational force of motor (310) to the holder part (200) so that the holder part (200) can rotate at as much as a predetermined angle.

The battery (330) may transmit an electric power to the motor (310) or to the decelerator (320). The battery (330) may be charged by being electrically connected to an outside electric power source via a wired electric line. At this time, the battery (330) may supply a part of electric power supplied to the battery (330) to the motor (310) or to the decelerator (320) and may be charged through a remaining electric power.

The gun holder according to an exemplary embodiment of present invention may further comprise an interface part (400), a display part (500) and a controller (600).

The interface part (400) may be embedded with a means recognizable of a user to thereby recognize the user. The interface part (400) may be formed with a second electronic tag recognition part (not shown) as the recognition means. For example, the identification tag (20) always worn by a user may be embedded or arranged with the second electronic tag inputted with a user information, and the second electronic tag recognition part can recognize a user by recognizing the second electronic tag (210) of the identification tag (20). The second electronic tag (21) may be a microchip, and may not be limited in types or shapes as long as the second electronic tag (21) can recognize a user through the interface part (400). That is, the interface part (400) can select the gun assigned to a user by providing, by the user, the identification tag (20) to the second electronic tag recognition part. Meantime, the recognizable means may be fingerprint recognizer (not shown) recognizable of a user's fingerprint, and may be also used along with the second electronic tag recognition part as recognizable means.

The display part (500) may display, via a screen, matters of guns being accommodated on or withdrawn from the gun holder according to an exemplary embodiment of present invention. The display part (500) may include an interface part (400). For example, the display part (500) may be formed with a touch screen manipulatable through a user's touch, where the user may withdraw the gun (10) from the gun holder or accommodate the gun (10) into the gun holder by touching a button (not shown) or a manipulation part (not shown) displayed on the touch screen. At this time, the second electronic tag recognition part (not shown) may be provided by being spaced apart from the screen of the display part (500).

When a user manipulates the interface part (400), the controller (600) may perform a command in response to the manipulation, and may send an electric signal to all elements included in the gun holder according to an exemplary embodiment of present invention. For example, when a user is recognized through the interface part (400), the controller (600) may recognize a user's relevant gun (10) through the first electronic tag recognition part (213), and may send an electric signal to all elements to allow the holder part (200) to rotate at a predetermined angle by driving the driving part (300) so that the gun (10) can be positioned at a front side of user, and may send an electric signal to the first locking means (221) to allow the first locking means (221) of second holder part (220) to be unlocked. Furthermore, when the user stands a gun on an empty slot of the holder part (200), the first electronic tag recognition part (213) may recognize the first electronic tag (11) and send a signal to the controller (600), where the controller (600) may send an electric signal to the first locking means (221) so that the first locking means (221) can be locked.

The gun holder according to an exemplary embodiment of present invention may further comprise a shock sensor (not shown) and a warning means (510). That is, when any one user applies a shock to the gun holder with an intention to rob the gun holder of a gun (10), and when there is a possibility of a stood gun (10) being disengaged from the gun holder due to other external shock, the shock sensor may detect the shock, and send an electric signal to the controller (600), where the controller (600) may send an electric signal to the warning means (510) in order to notify, through the warning means (510), the situation of the shock being applied.

Although the drawings show that the warning means (510) is indicated as a warning light, a speaker (not shown) may be further mounted as one of examples for the warning means (510), and a warning sound may be generated through the speaker. Furthermore, the gun holder according to an exemplary embodiment of present invention may be mounted with a wireless communication function such as Wi-Fi or Bluetooth, and a commander can ascertain the shocking situation or a situation of the gun (10) having been robbed or taken out by receiving the situations through the wireless communication function using a portable electronic device. In addition, the commander may activate the gun holder via wireless communication by manipulating a portable electronic device.

The gun holder according to an exemplary embodiment of present invention may further comprise a support part (700) and a case (800).

The support part (700) may be disposed at a lower side of central shaft (100) and the holder part (200) to support the central shaft (100) and the holder part (200). Furthermore, the support part (700) may be disposed at an upper surface with a driving part (300) for rotating the holder part (200), i.e., a motor (310), a decelerator (320) and a battery (330).

The support part (700) may be disposed with a second locking means (710) in order to be coupled with the case (800, described later). The second locking means (710) may be opened or closed in response to a signal from the controller (600).

The case (800) may be disposed at an upper side of support part (700) to cover the central shaft (100) and the holder part (200). The case (800) may take a pillar or a conic shape, but these shapes are a manufacturer's optional matter, and the case (800) may be formed with other various shapes. A part of lateral surface of case (800) may be formed with an opening (810). The opening (810) may be formed in correspondence with the size of a gun (10). It is preferable that the opening (810) be formed to be larger than the gun (10) for easy accommodation and discharge of gun (10). In addition, the opening (810) may be so formed as to allow any one slot only of the holder part (200) to be exposed to outside. That is, a user may accommodate or take out only the gun (10) allocated to the user through the opening (810), and it is impossible to take out a gun (10) accommodated to a slot adjacent to any one slot exposed through the opening (810). The case (800) may be coupled with the support part (700) by the second locking means (710), such that when the second locking means (710) is released of locking by a signal from the controller (600) through the user's manipulation of interface part (400), the case (800) may be removed by the user. At this time, setting may be enabled through the user's manipulation of interface part (400) to allow the first locking means (221) of holder part (200) to be also unlocked.

Albeit not being illustrated on the drawings, the opening (810) may be formed at an upper surface of case (800). In this case, a user may accommodate or take out the gun (10) through the opening (810) at the upper surface of case (800). Furthermore, because a part of the second holder part (20) is protruded, and when the opening (810) is formed at an upper surface of case (800), it is preferable that a distance between an inner surface of case (800) and a stood gun (10) be formed to be relatively wider than a case where the opening (810) is installed at a lateral surface of case (800), in order to avoid interference of gun (10) with the second holder part (200) when a user accommodate or take out the gun (10).

Meantime, the controller (600) may send an electric signal to the driving part (300) for a predetermined time when there is no activation by a user, whereby an empty slot of plurally-divided holder part (200) can be exposed through the opening (810). This configuration is to prevent the gun (10) from being taken out during a normal time when a user does not accommodate or take out the gun (10) and to allow an easy accommodation of gun (10).

Hereinafter, operation of gun (10) being taken out from the gun holder according to an exemplary embodiment of present invention will be described in detail.

The gun holder according to an exemplary embodiment of present invention may be such that an empty slot of holder part (200) is exposed through the opening (810) during a normal time when there is no behavior of accommodation or discharge of gun (10) by a user.

First, a user may manipulate the interface part (400) in order to take out the gun (10) from the gun holder according to an exemplary embodiment of present invention, prepare a user's identification tag (20) and allow the tag (20) to be recognized by a second electronic tag recognition part (not shown). At this time, a fingerprint recognizer may be used instead of the second electronic tag recognition part as a user recognizable means, and it is also possible to concurrently use the second electronic tag recognition part and the fingerprint recognizer.

Next, the second electronic tag recognition part or the fingerprint recognizer may send user information to the controller (600) via an electronic signal. The controller (600) may rotate the holder part (200) by sending an electric signal to the driving part (300) in order to allow the allocated gun (10) to be exposed through the opening (10) after recognizing the user information. At this time, the controller (600) may calculate an angle with the opening (810) based on the central shaft (100) by grasping the position of allocated gun (10), and send an electric signal to the driving part (300) so that the holder part (200) can rotate as much as the calculated angle.

When the gun (10) allocated to the user is exposed to the opening (810) by allowing the holder part (200) to rotate, the controller (600) may unlock the first locking means (221) by sending an electric signal to the first locking means (221) of the second holder part (220).

In addition, the user may take out the gun (10) allocated to the user from the opening (810) by grasping the allocated gun (10).

Hereinafter, an operation process of a gun (10) being accommodated to the gun holder according to an exemplary embodiment of present invention will be described in detail.

A user may stand a taken-out gun (10) to an empty space of holder part (200) exposed at the opening (810). At this time, a through hole (not shown) at a stand groove (211) of the first holder part (210) may be arranged with a first electronic tag recognition part (213), whereby a buttstock of a to-be-accommodated gun (10) is positioned to correspond to the first electronic tag recognition part (213), and the first electronic tag recognition part (213) may recognize the first electronic tag (11) arranged on the buttstock of gun (10) to be accommodated. The first electronic tag recognition part (213) may recognize a user by recognizing the first electronic tag (11), and transmit user information to the controller (600) by converting the recognized user information to an electric signal.

Furthermore, when the stand sensor (222) of second holder part (220) recognizes the gun barrel of gun (10) stood on the second holder part (220), and send an electric signal to the controller (600), the controller (600) may send an electric signal to the first locking means (221) whereby the first locking means (221) may perform the locking of the gun (10) to prevent the gun (10) stood on the holder part (200) from being taken out.

Successively, the controller (600) may send a signal to the driving part (300) to drive the driving part (300) and to rotate the holder part (200) whereby an empty slot of holder part (200) closest to the stood gun (10) can be exposed to the opening (810).

Furthermore, the controller (600) may send an electric signal to the display part (500) to allow a user to ascertain a position of the stood gun (10) through a screen of the display part (500).

The situation information of the abovementioned gun (10) being taken out or accommodated may be transmitted to a commander's portable electronic device through a wireless communication via Wi-Fi or Bluetooth.

Hereinafter, a process of the gun (10) being taken out from the gun holder according to an exemplary embodiment of present invention will be described in detail for a situation when a combat or an emergency situation comparable thereto occurs.

At this time, a commander may allow his or her identification tag (20) to be recognized onto the first electronic tag recognition part (213), and activate the interface part (400) to unlock the locked state of second locking means (710). If a commander is absent from a premise of barrack, i.e., is not present within a premise of a barrack, the second locking means (710) may be unlocked via wireless communication through activation of electronic device hand-carried by the commander.

Thereafter, the case (800) may be removed from the gun holder. Furthermore, the controller (600) may recognize the removal of case (800) and release the locked state of first locking means (221) by sending an electric signal to the first locking means (221).

Hence, the user can take out the allocated gun (10) from the holder part (200) or from the gun holder.

The above-described exemplary embodiments are possible examples of implementations and merely set forth for a clear understanding of the principles of the invention. It will be understood that the present invention is not limited to the abovementioned exemplary embodiments, the exemplary embodiments may be mutually changed or combined, and various changes may be made by those skilled in the art without departing from the subject matter and the spirit of the invention.

The invention claimed is:

1. A gun holder comprising:
a case including an upper plate and a lateral plate extending from said upper plate;
a holder part disposed in said case;
a central shaft rotatably disposed in said holder part;
a driving part to allow said holder part to rotate; and
a support part coupled with said lateral plate of said case;
said holder part including
a first holder part in which a buttstock of a gun is disposed, and
a second holder part in which a gun barrel of the gun is disposed;
said first holder part including a groove recessed from an upper surface of said first holder part and disposed on a portion of the buttstock of the gun;
said groove of said first holder including a bottom surface and first, second, and third inner lateral surfaces facing three surfaces of the buttstock of the gun;
said bottom surface of said groove of said first holder part being opened in a first direction toward said central shaft;
said second holder part including
a first plate,
a second plate spaced apart from said first plate,
a third plate connected to said first and second plates, and
a hole formed by said first, second, and third plates;
said hole of said second holder part being configured for a gun barrel of the gun to pass therethrough;
said third plate of said second holder part overlapping a portion of the gun barrel of the gun in a second direction opposite to said first direction;
said driving part including a motor rotating said holder part about said central shaft, a decelerator adjusting the rotation of said motor, and a battery providing power to said motor or to said decelerator, said holder part being rotated as much as a predetermined angle by said motor and said decelerator.

2. The gun holder of claim 1, wherein said holder part is so arranged as to allow an extension line of the gun barrel to converge toward said central shaft or an extension line of said central shaft.

3. The gun holder of claim 1, wherein said holder part rotates with said central shaft and a rotation angle of said first holder part is equal to a rotation angle of said second holder.

4. The gun holder of claim 1, wherein said first holder part includes a plurality of first holders, said plurality of first holders being disposed radially with respect to said central shaft, an angle between said plurality of first holders being an acute angle.

5. The gun holder of claim 1, wherein said first holder part includes a first electronic tag recognition part recognizable of an electronic tag installed on the buttstock of the gun.

6. The gun holder of claim 1, wherein said second holder part includes a plurality of second holders, said plurality of second holders being disposed radially with respect to said central shaft, an angle between said plurality of second holders being an acute.

7. The gun holder of claim 1, wherein said second holder part includes a stand sensor recognizing the gun is disposed in said second holder part.

8. The gun holder of claim 1, further comprising:
an interface part recognizable of a user and selectable of gun allocated to the user in response to the user's intention;
a first locking means to lock a gun;
a display part displaying accommodation and withdrawal state of the gun on a screen; and
a controller sending an electric signal to each element to allow the guns to be stood or withdrawn by a user's manipulation through said interface part.

9. The gun holder of claim 8, wherein said display part is formed with a touch screen manipulatable through a user's touch by allowing said interface part to be embedded in said screen.

10. The gun holder of claim 8, wherein said interface part is embedded with a recognizable means recognizable of a user.

11. The gun holder of claim 10, wherein said recognizable means further includes a first electronic tag recognition part recognizable of an electronic tag installed on the buttstock of the gun and a second electronic tag recognition part recognizable of an electronic tag possessed by a user, said first locking means unlocking the gun allocated to the user when said first electronic tag recognition part recognizes the electronic tag of the gun allocated to the user and when said second electronic tag recognition part recognizes a user's electronic tag.

12. The gun holder of claim 10, wherein said recognizable means recognizes a user's fingerprint.

13. The gun holder of claim 8, further comprising:
a shock sensor detecting an outside shock; and
a warning means notifying the outside shock detected by said shock sensor to a user using the controller.

14. The gun holder of claim 8, further comprising:
a support part supporting said central shaft and said holder part; and
a second locking means disposed at said support part to prevent said case from being disengaged;
said case being disposed at said support part with a pillar or conical shape to cover said central shaft and said holder part and formed with an opening at a lateral surface or at an upper surface to allow a user to withdraw or accommodate the gun.

15. The gun holder of claim 14, wherein said case is removed by the user, and said controller sends a signal to said first locking means to unlock the locking of said first locking means, when said second locking means is unlocked by a user.

16. The gun holder of claim 14, wherein a slot not stood with the gun is exposed to an outside by an opening when there is no manipulation of said interface part by the user.

* * * * *